(12) United States Patent
O'Hara et al.

(10) Patent No.: US 10,423,143 B1
(45) Date of Patent: Sep. 24, 2019

(54) AEROBIC SEPTIC SYSTEM HEALTH MONITOR AND MAINTENANCE DEVICE, SYSTEM, AND METHOD OF ITS USE

(71) Applicant: Wavetech LLC, Stillwater, OK (US)

(72) Inventors: John F. O'Hara, Stillwater, OK (US); Ethan J. Abele, Stillwater, OK (US)

(73) Assignee: Wavetech, LLC, Stillwater, OK (US)

( * ) Notice: Subject to any disclaimer, the term of this patent is extended or adjusted under 35 U.S.C. 154(b) by 47 days.

(21) Appl. No.: 15/625,654

(22) Filed: Jun. 16, 2017

Related U.S. Application Data

(60) Provisional application No. 62/351,074, filed on Jun. 16, 2016.

(51) Int. Cl.
    *G05B 13/00* (2006.01)
    *G05B 19/048* (2006.01)
    *G06Q 10/00* (2012.01)

(52) U.S. Cl.
    CPC .......... *G05B 19/048* (2013.01); *G06Q 10/20* (2013.01); *G05B 2219/24015* (2013.01)

(58) Field of Classification Search
    CPC .............................. G05B 19/048; G06Q 10/20
    See application file for complete search history.

(56) References Cited

U.S. PATENT DOCUMENTS

| | | | |
|---|---|---|---|
| 6,186,743 B1 * | 2/2001 | Romer .................... | F04B 41/06 361/191 |
| 6,863,805 B1 * | 3/2005 | Barreras, Sr. ...... | B01D 21/0006 210/143 |
| 8,321,039 B2 * | 11/2012 | Graves ................. | G06Q 20/102 700/80 |
| 2004/0002822 A1 * | 1/2004 | Keck ...................... | G01F 23/00 702/55 |
| 2009/0008338 A1 * | 1/2009 | Dunbar ................... | E03F 11/00 210/741 |
| 2011/0253604 A1 * | 10/2011 | Mercer ................... | C01B 13/11 210/85 |
| 2015/0272504 A1 * | 10/2015 | Giancardo ........... | A61B 5/7267 600/595 |

* cited by examiner

*Primary Examiner* — Mohammad Ali
*Assistant Examiner* — Sheela Rao
(74) *Attorney, Agent, or Firm* — Gable Gotwals

(57) ABSTRACT

Embodiments of an aerobic septic system health monitor, and a method of its use, incorporate a microcontroller, with associated software, in communication with an aerobic septic system (electro-mechanical) controller that, in turn, is connected to at least one aerobic septic system component and component sensor. By using the microcontroller and software, highly specific monitoring and feedback is available to a user. This approach also offers a clear and easily accessible interface between the user and the aerobic septic system, whereas no such interface exists on prior art systems. The monitor also offers multiple redundancy to address system failures, unlike prior art. Finally, it enables several forms of preventative maintenance that simply don't exist in prior art systems. In some embodiments, the monitor may serve as the aerobic septic system controller, either overriding or supplementing the installed controller or replacing it.

15 Claims, 3 Drawing Sheets

AEROBIC SEPTIC SYSTEM HEALTH MONITOR AND MAINTENANCE DEVICE, SYSTEM, AND METHOD OF ITS USE

CROSS REFERENCE TO CO-PENDING APPLICATIONS

This application claims priority to U.S. 62/351,074, filed Jun. 16, 2016.

BACKGROUND

This invention relates to devices intended for use in aerobic septic treatment systems and, more particularly, to devices intended to control or monitor the performance of these systems.

Aerobic septic systems are a relatively new approach to home or commercial sewage treatment. Many, if not the large majority, of such systems have been installed in the last 10 years and they still number less than conventional gravity systems. The controllers used in aerobic septic systems are adequate for basic operation but are technologically primitive and inadequate for preventative maintenance or for addressing system failures. Since their introduction, aerobic septic systems have relied on electro-mechanical controls. The benefit of such controls is that they operate anywhere AC power is available. The downside is that they are not very functional and can leave the whole aerobic septic system in an un-operable state with no indication to the user.

Existing electro-mechanical controls on aerobic septic systems are very simple. A basic mechanical timer is used to actuate the sprinkler system. Fault monitoring is performed by two internal switches, both housed in the aerobic septic system control enclosure. One switch closes when the air pump fails. The other is a pressure switch that closes when air pressure from the pump becomes too low. Closing either switch will illuminate a light and/or activate a buzzer on the outside of the enclosure. The light or buzzer is only intended to tell the user something is wrong.

This is the full functional extent of prior systems: primitive mechanical timer circuits, unreliable and crude indicators (e.g., lights, buzzers) of unspecific failures, and no method of addressing preventative maintenance. If something fails, the existing system is not specific about what went wrong. The user must hire a contractor to both diagnose and repair the system, leading to larger repair bills. The failure indicators (light bulb and buzzer) are subject to potentially harsh environmental conditions (e.g., weather, dust, mechanical strikes) and may easily break or burn out. The buzzer may also be silenced by a bypass switch with no indication that it has been disabled. In either case, the user never realizes anything is wrong, either with the system or its indicators, leading to long term outages and much more costly repairs.

The existing systems do not at all address numerous maintenance requirements, such as the addition of bleach, cleaning of air pump filters, flushing air lines, or regular pumping/cleanout of tanks. Users must keep track of all such maintenance themselves, which often leads to neglect. Existing systems also require the user to reset a mechanical clock after power failures to ensure sprinklers do not activate at unwanted times.

Prior systems, as described above, are very simple "dumb" electrical circuits that operate on an electro-mechanical timer and basic switches. These offer minimum feedback or interfacing to the user and are prone to undetectable or inconspicuous failures. A need exists for an improved monitoring/control device for aerobic septic systems that offers new functionality compared to existing electro-mechanical control systems.

SUMMARY

Embodiments of an aerobic septic treatment system health monitor, and a method of its use, incorporate a microcontroller, with associated software, in communication with an aerobic septic system (electro-mechanical) controller that, in turn, is connected to at least one aerobic septic system component and component sensor. By using the microcontroller and software, highly specific monitoring and feedback is available to a user or maintainer of the aerobic septic system. This approach also offers a clear and easily accessible interface between the user and the aerobic septic system, whereas no such interface exists on prior art systems. The monitor also offers multiple redundancy to address system failures, unlike prior art systems. Finally, it enables several forms of preventative maintenance that simply do not exist in prior art systems. In some embodiments, the monitor may serve as the aerobic septic system controller, either overriding the installed electro-mechanical controller or replacing it.

DETAILED DESCRIPTION

Embodiments of an aerobic septic system health monitor device and method of this disclosure can provide the following benefits:

(1) reminds the user when maintenance is due;
(2) specifies the cause of a failure;
(3) sets its own clock after a power failure;
(4) provides immediate notice to the user/maintainer when a failure occurs;
(5) reminds the user/maintainer when failures are not acknowledged;
(6) extends lifetime beyond that of electro-mechanical controls because it is solid state;
(7) provides multiple redundancy over fault-prone lights or buzzers to inform the user/maintainer of a failure;
(8) allows the user to choose who to send failure notices and maintenance reminders;
(9) sends messages to multiple people if the user/maintainer chooses to do so;
(10) allows the user/maintainer to choose which messages to send and when;
(11) enables the conveyance of messaging no matter where the user/maintainer is located, worldwide, so long as the same has access to the internet and email or text messaging;

(12) permits several different maintenance reminders to be established;
(13) permits analog system parameters to be monitored and controlled, such as air pump pressure;
(14) allows the user or maintainer to monitor the system health via a webpage;
(15) may be configured to alert a contractor or other third party when a failure occurs, thus permitting the same to respond rapidly and appropriately to a fault condition;
(16) may be configured to alert a contractor when maintenance is due, thus permitting the contractor to perform maintenance without the user's involvement, if some maintenance agreement has been arranged;
(17) requires no signal connections the user's residence to perform any of its functions, so long as wireless networking is available; and
(18) permits new failure modes to be detected, such as system over-pressure leading to premature air pump failure.

Figure 1:
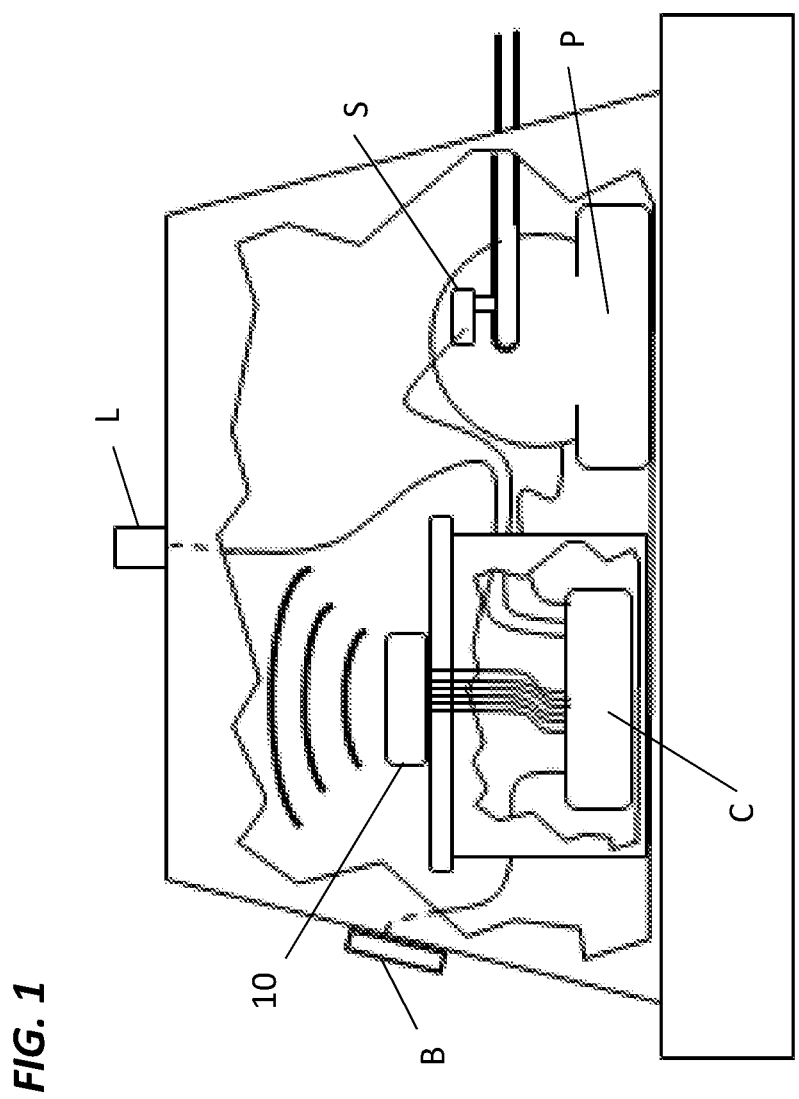
FIG. 1 is a diagram of an embodiment of a health monitor and maintenance device when installed in a control enclosure of an aerobic septic system and connected to the controller of the aerobic septic system.
Figure 2:
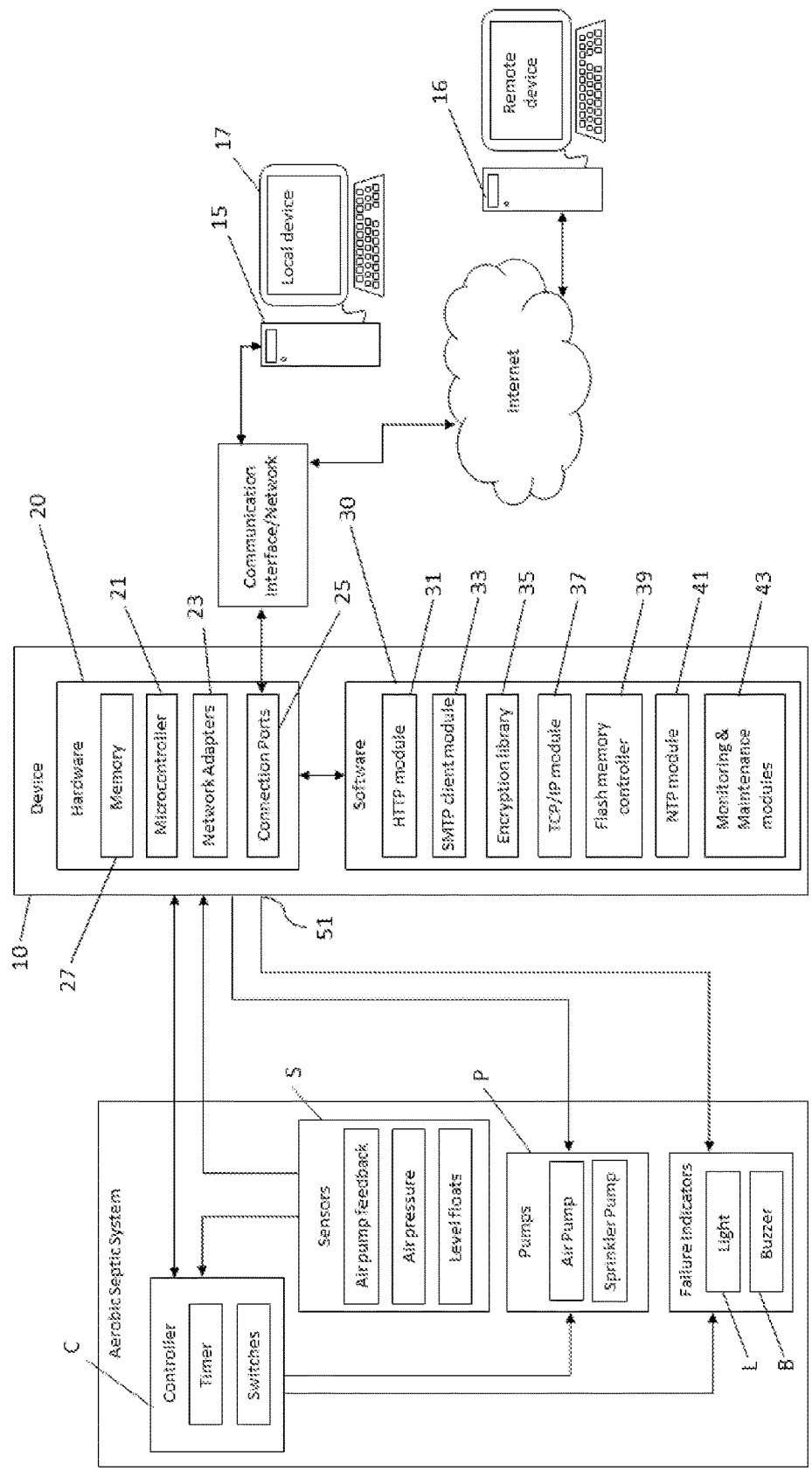
FIG. 2 is a schematic of the hardware and software components of the health monitor device of FIG. 1 in relation to aerobic septic system hardware and a computing device such as but not limited to a mobile device.
Figure 5:
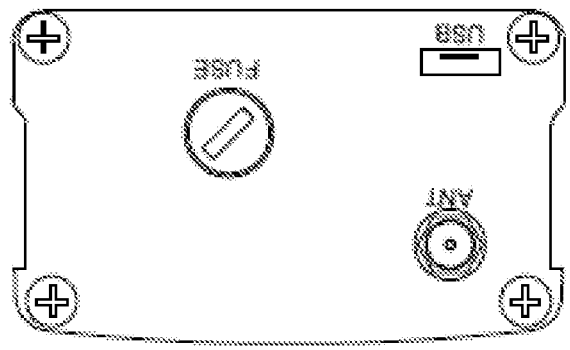
FIG. 5 is a right side elevation view of the health monitor device of FIG. 3.
Figure 3:
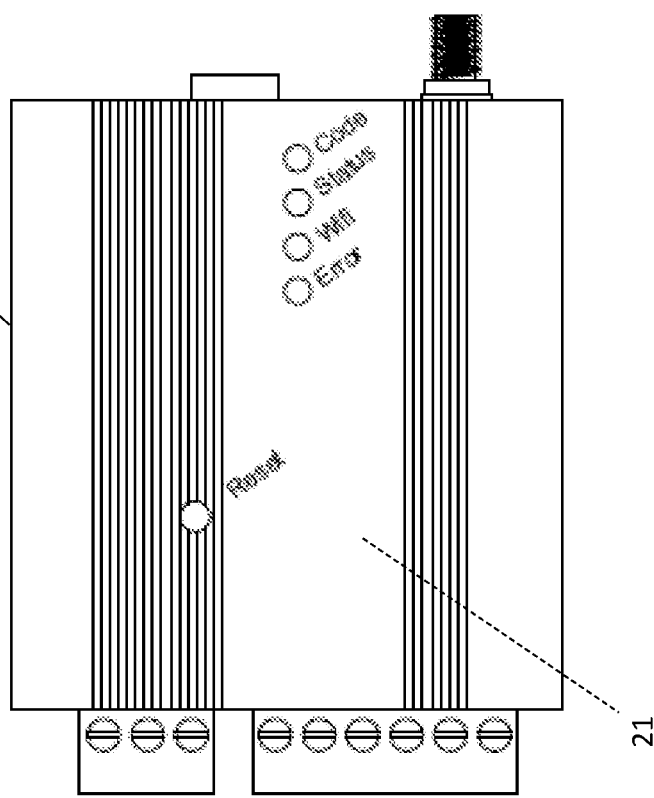
FIG. 3 is a top plan view of an embodiment of the health monitor device.
Figure 4:
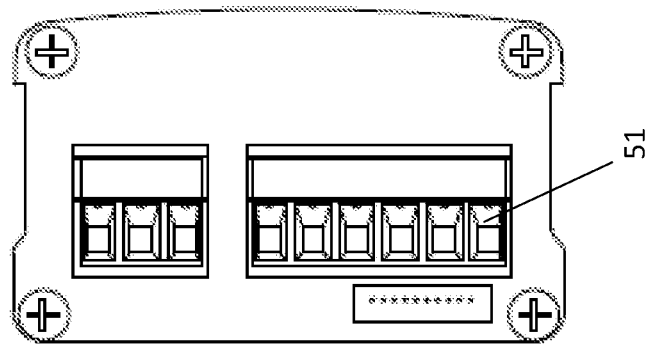
FIG. 4 is a left side elevation view of the health monitor device of FIG. 3.

Referring to FIGS. 1-3, embodiments of an aerobic septic system health monitor device 10 include an electronic microcontroller 21 meant to augment or replace the existing electro-mechanical controls C of the aerobic septic system, thereby greatly increasing functionality. The monitor 10 may be hardwired to the existing aerobic septic system controller C. In some embodiments, the monitor 10 is in communication with a computing device 15 such as but not limited to a desktop computer, laptop computer, tablet computer, or a mobile phone.

The monitor 10 is solid state, sets its own clock, and is arranged to:
monitor the aerobic septic system for component-level or system-level failures;
track total aerobic septic system operating times and issue scheduled maintenance reminders to the user/maintainer;
link to the internet through the user's local wireless network;
via a web-server interface or cloud-based connection, allow the user to monitor the aerobic septic system online, or change software settings, such as but not limited to messaging email addresses, maintenance schedules, and local network settings;
create specific maintenance and/or failure messages tailored to the exact issue in the aerobic septic system that requires attention;
send messages to the user via text messaging or email; and
if desired, replace the electro-mechanical aerobic control system Monitor 10 includes hardware 20 that enables connection to the aerobic septic system and to network-connected devices and systems and software 30 executed by the hardware 20 to enable functionality.

On the hardware side, embodiments of monitor 10 includes a collection of circuitry having several subsystems: (1) an embedded microcontroller 21; (2) wireless network adapters 23 which enable internet communication via a local network connection; (3) connection ports 25 which are used to power the invention, provide a separate communication channel to configure wireless networking, and provide the microcontroller 21 with monitoring voltages produced throughout the aerobic septic system. These voltages may indicate, by way of example, whether a pump has failed, air pressure is out of range, or pumps are operating. Any component of the aerobic septic system that is controlled or monitored electrically may be tied to the microcontroller 21 through these ports 25.

In some embodiments, monitor 10 has its own regulating power supply which converts the aerobic septic system voltage (typically 120 VAC) to an appropriate DC voltage that operates the monitor's electronics within a universal operating voltage range (e.g., 85-265 VAC). Monitor 10 may be housed in a dust- and water-proof enclosure 50 with exposed wire terminals 51 for the purpose of making connections to the aerobic septic system.

The microcontroller 21 is selected to accommodate the software requirements, including minimum amounts of volatile and non-volatile memory 27, sufficient numbers of input and output ports 25 for all monitoring and control tasks, and ease of integration with networking hardware and protocols. The microcontroller 21 also has analog-to-digital input and output ports 25 which can be used to enable monitoring and control of analog aerobic septic system parameters such as air-pump output pressure or tank liquid levels. These ports are not present on prior or existing systems and enhance the controllability of the system while also enabling new means of preventative maintenance and system diagnosis. The microcontroller 21 may also make available the availability SPI/I2C busses which enable expansion modules.

The hardware components 20 of the monitor 10 may be installed in the enclosure that houses the aerobic septic system air pump and electro-mechanical control box, or in the electro-mechanical control box itself. Wires are used to connect the invention to exiting electrical circuits in the aerobic septic system.

The software components 30, which are executed by the microcontroller 21 enable functionality. There are six core software components:
(1) a HTTP (hypertext terminal protocol) server module 31 that allows the user to interface and change invention software settings via a web page;
(2) a SMTP (simple mail transfer protocol) client module 33 that allows the invention to send emails and text messages to the user in the event of failures or maintenance reminders;
(3) an encryption library 35 that protects the user's email address and password during email or texting events;
(4) a TCP/IP (transmission control protocol/internet protocol) networking module 37 that allows the invention to connect to a wireless (IEEE 802.11) computer network;
(5) a flash memory controller 39 that permits non-volatile storage of the program and user's settings; and
(6) a NTP (network time protocol) module 41 that allows the invention to access Coordinated Universal Time through the internet and thereby set its own clock.

In addition to these modules 31-41, the software 30 includes a monitoring and maintenance module 43 that continually scans the hardware 20 for system failures or out-of-spec conditions. The maintenance functions performed by module 43 also keep track of the operating durations for the aerobic septic system as a whole and its components. When user-supplied duration settings are reached, or a failure is detected, the software 30 can trigger email and/or text messages to user-supplied recipients informing them of the required maintenance or repairs. In case of urgent failures, the software 30 periodically issues repeat messages until the issue is acknowledged by the user. This provides redundancy to failure notices, ensuring the user/maintainer is made aware of the situation in a timely manner.

The software 30 may include one or more webpages, served by the HTTP module 31, that allow the user/maintainer to change email or text messaging recipients, security settings for email and texting, SMTP settings, network settings, network security, email subject and message wording, failure actions, maintenance schedules, and parameters related to hardware control.

Finally, the software 30 can be configured to control hardware components of the aerobic septic system such as the timer, failure indicators, switches, and pumps, in cases where the user would like to fully replace the aerobic septic system's existing electro-mechanical controls, rather than just augment them. In these cases, the software 30 properly configures the microcontroller 20 to activate voltage-controlled relays that turn on/off pumps P, lights, L buzzers B, or any other electrical device within the entire aerobic septic system. These software functions operate in conjunction with other modules to enable proper operation of the aerobic septic system. For example, software that activates the sprinkler pump would reference the timing module to ensure that sprinkling occurred at the proper time.

In some embodiments, monitor 10 includes an enclosure 50 including one or more exposed wire terminals 51; a microcontroller 21 housed within the enclosure 50 and including instructions stored on non-transitory computer readable medium 20 and connection ports 25; and a computing device 15 including a display 17 and connected to the microcontroller 21 by way of a communication network and/or interface. The microcontroller 21 may be connected by way of the one or more exposed wire terminals 51 and connection ports 25 to the aerobic septic system controller C. The aerobic septic system controller C, in turn, is connected to a component of an aerobic septic system, such as but not limited to a pump P, and to at least one sensor S of the aerobic septic system. When in use the microcontroller 21 monitors the at least one sensor S and may control one or more components. The computing device 17 may display a status of the component as sensed by the at least one sensor S or be used to configure the aerobic septic system monitor 10.

Embodiments of a method executed by the microcontroller 21 includes querying at least one sensor S connected to a component of the aerobic septic system; determining a current state of the at least one sensor S; adding the current state and a time stamp to a state history of the component; calculating a total operating time of the component; determining whether the component is performing within a predetermined acceptable operating limit; creating a message regarding performance of the component; establishing a communication link to a local computing network for the purpose of internet connectivity; and sending the message over the local computing network to a local computing device 15 or to a remote computing device 16 connected to the internet. The computing device 15 is optional; the monitor 10 may communication messages over the internet without device 15.

The method may also include receiving a message from the local computing device 15 or remote computing device 16 and the microcontroller 21 changing a state of the component in response to the received message. The microcontroller 21 may also determine whether a maintenance action is required.

While embodiments have been described, the aerobic septic system monitor and method of its use may be subject to changes that fall within the scope of this disclosure or are equivalent to the elements or steps recited in the following claims.

What is claimed:

1. An aerobic septic system comprising:
   an electro-mechanical controller including at least one control component, the electro-mechanical controller configured to provide primary control of the aerobic septic system;
   an aerobic system health monitor connectable to a circuit of the electro-mechanical controller containing the at least one control component, said monitor including:
   a microcontroller including software containing at least one module selected from the group consisting of a HTTP module, a SMTP module, and a TCP/IP module;
   the microcontroller connected to the circuit of the electro-mechanical controller containing the at least one control component and configured to monitor a current, a voltage, or the current and the voltage of the circuit independently of the electro-mechanical controller to:
   determine a current state of the at least one control component based upon the current, the voltage, or the current and the voltage of the circuit;
   add the current state and a time stamp to a state history of the at least one control component;
   calculate a total operating time of the at least one control component;
   decide based upon the current, the voltage, or the current and the of the circuit whether the at least one control component is performing within predetermined acceptable operating limits for the current, the voltage, or the current and the voltage;
   create, based upon the decide step, a message regarding performance of the at least one control component;
   establish a communication link to a wireless network; and
   send the message over the wireless network to a computing device in communication with the wireless network.

2. The aerobic septic system of claim 1, further comprising the software including an encryption library.

3. The aerobic septic system of claim 1, further comprising the software including a flash memory controller.

4. The aerobic septic system of claim 1, further comprising:
   the at least one control component including a timer configured to actuate a water pump.

5. The aerobic septic system of claim 1, further comprising:
   the at least one control component including a fault monitoring switch connected to an air pump.

6. The aerobic septic system of claim 1, further comprising:
   the at least one control component including a sensor.

7. A method of monitoring the status of an aerobic septic system, the aerobic septic system including:
   an electro-mechanical controller including at least one control component of the aerobic septic system, the electro-mechanical controller configured to provide primary control of the at least one component, and;
   an aerobic system health monitor including a microcontroller configured to operate independently of the electro-mechanical controller and being in a circuit containing the at least one control component;
   the method being executed by a set of computer executable instructions stored on non-transitory computer readable medium and executed by the microcontroller, the set of computer executable instructions including at least one module selected from the group consisting of a HTTP module, a SMTP module, and a TCP/IP module, the method comprising the microcontroller:

monitoring a current, a voltage, or a the current and the voltage of the circuit connected to the at least one control component of the aerobic septic system that is controlled by the electro-mechanical controller;

determining a current state of the at least one control component based upon the current, the voltage, or the current and the voltage of the circuit;

adding the current state and a time stamp to a state history of the at least one control component;

calculating a total operating time of the at least one control component;

deciding based upon the current, the voltage, or the current and the voltage whether the at least one control component is performing within predetermined acceptable operating limits for the at least one control component;

creating a message regarding performance of the at least one control component;

establishing a communication link to a network; and sending and receiving the message over the network to a computing device in communication with the network; and receiving a message from the computing device.

8. A method according to claim 7 further comprising the microcontroller determining whether a maintenance action is required.

9. The method of claim 7, wherein the at least one control component includes a timer configured to actuate a water pump.

10. The method of claim 7, wherein the at least one control component includes a fault monitoring switch connected to an air pump.

11. The method of claim 7, wherein, the at least one control component including a sensor.

12. An aerobic septic system comprising:

an electro-mechanical controller configured to provide primary control of the aerobic septic system, the electro-mechanical controller including at least one control component selected from the group consisting of a timer configured to actuate a water pump and a fault monitoring switch connected to an air pump;

an aerobic system health monitor connectable to a circuit of the electro-mechanical controller containing the at least one control component, the monitor including a microcontroller and software containing at least one module selected from the group consisting of a HTTP module, a SMTP module, and a TCP/IP module;

the microcontroller configured to:

monitor a current, a voltage, or the current and the voltage of the circuit independently of the electro-mechanical controller;

decide, based upon the current, the voltage, or the current and the voltage whether the at least one control component is performing within predetermined acceptable operating limits for the current, the voltage, or the current and the voltage;

create, based upon the decide, a message regarding performance of the at least one control component;

establish a communication link to a wireless network; and send the message over the wireless network to a computing device in communication with the wireless network.

13. The aerobic septic system of claim 12, further comprising:

the electro-mechanical controller including at least one sensor.

14. The aerobic septic system of claim 12, further comprising:

the software including an encryption library.

15. The aerobic septic system of claim 12, further comprising:

the software including a flash memory controller.

* * * * *